Figure 1:
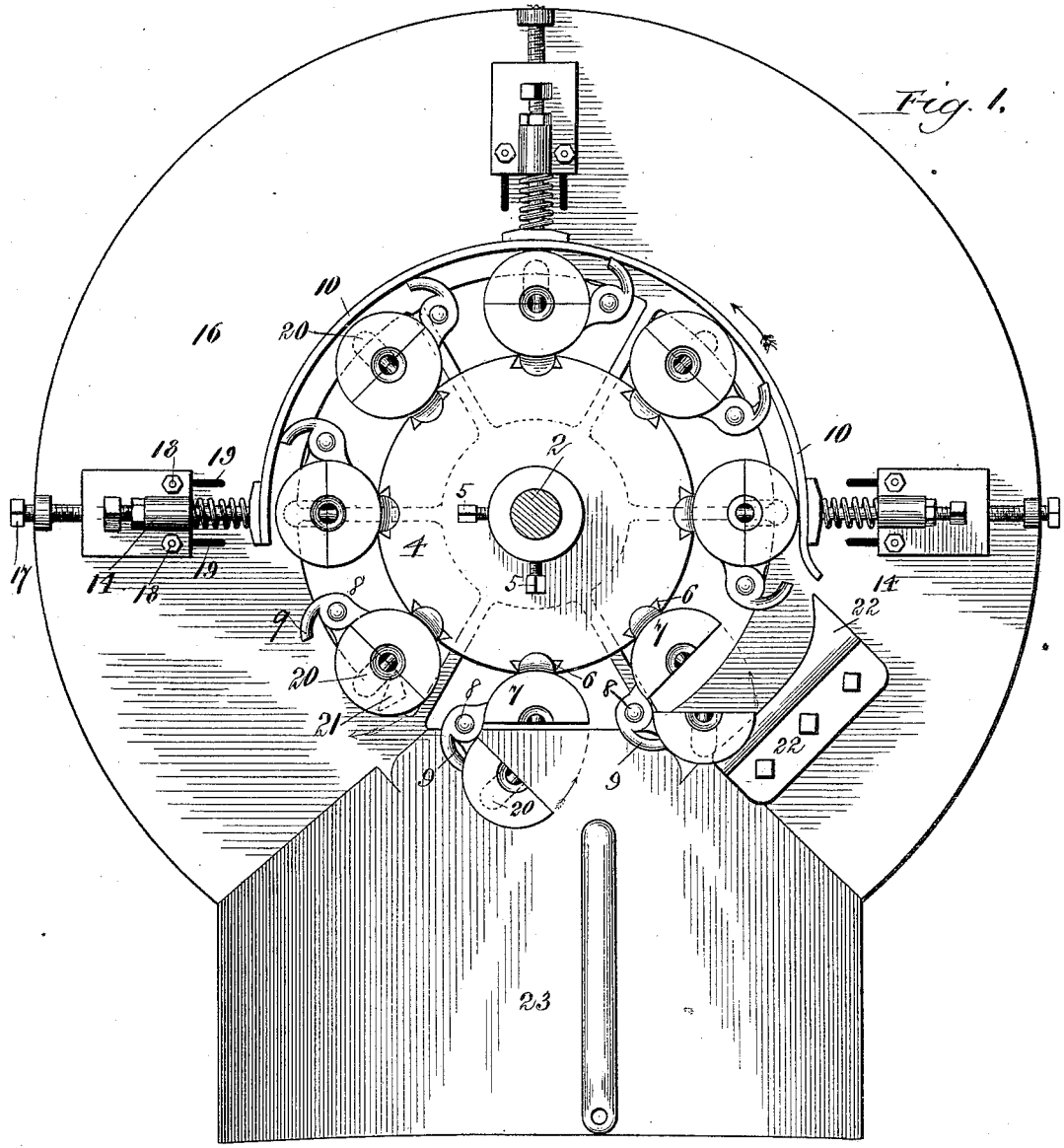

(No Model.) 3 Sheets—Sheet 1.

F. N. CLINE.
MACHINE FOR MAKING CASTINGS.

No. 427,837. Patented May 13, 1890.

Witnesses

Inventor
F. N. Cline
By Raymond & Veeder
Att'ys

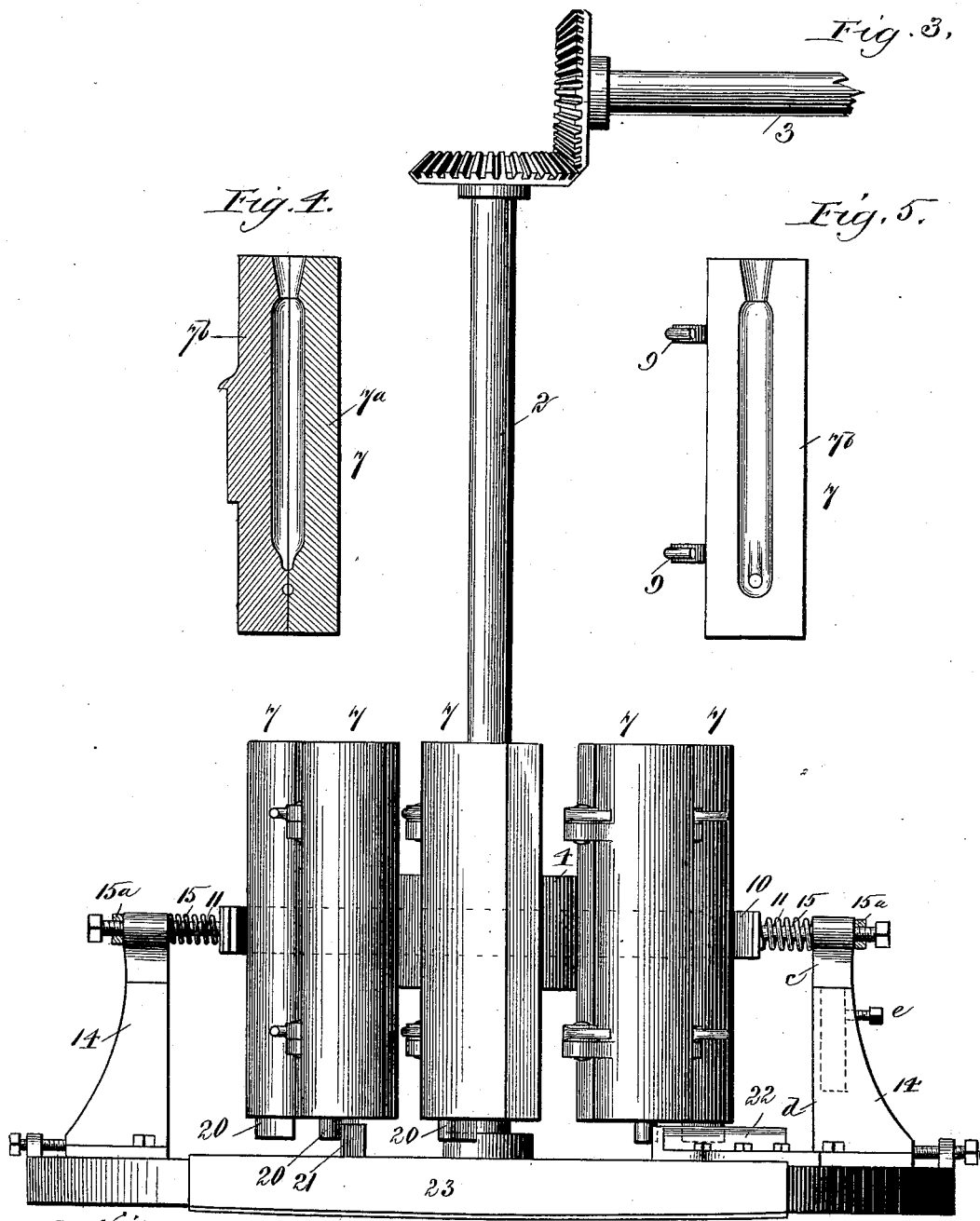

(No Model.) 3 Sheets—Sheet 3.
F. N. CLINE.
MACHINE FOR MAKING CASTINGS.
No. 427,837. Patented May 13, 1890.
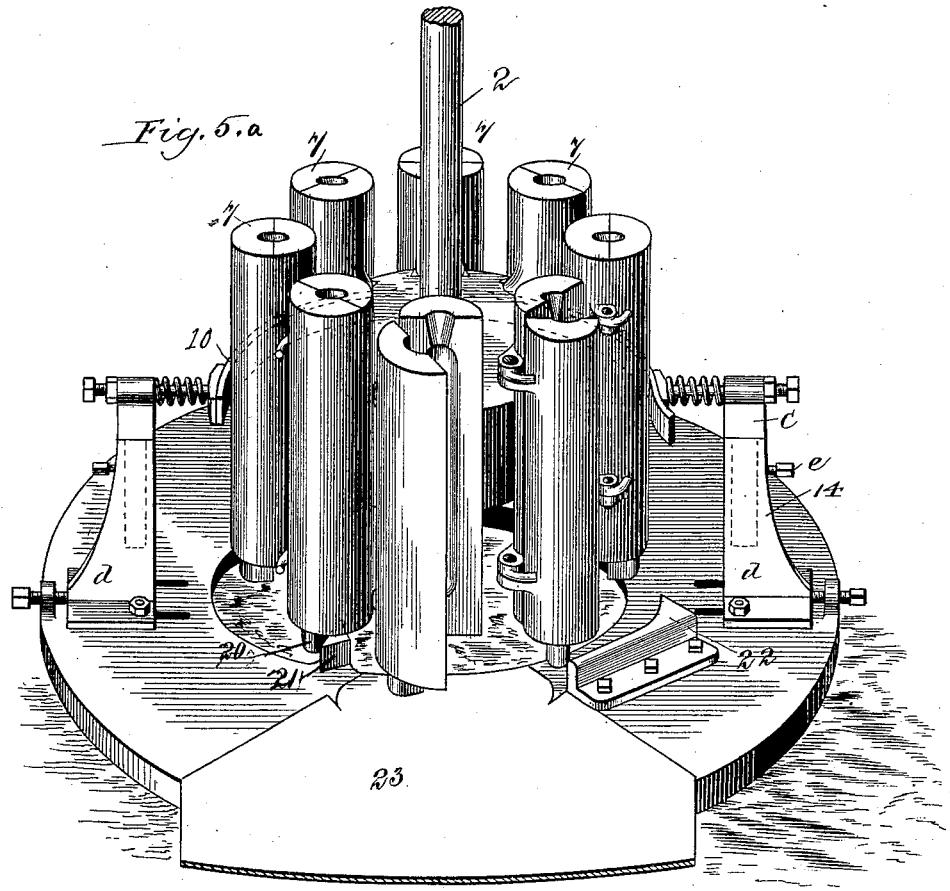
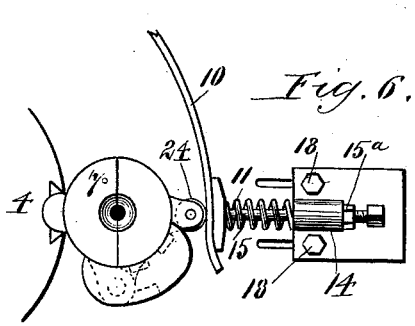
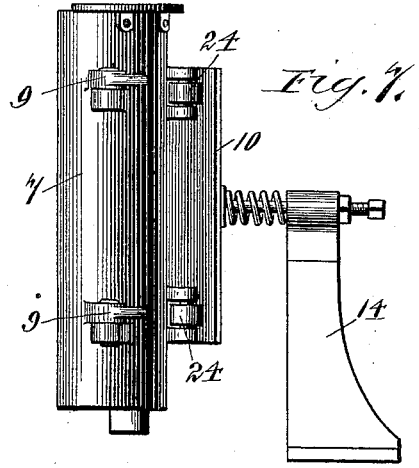
Witnesses
N. Rossiter
P. H. T. Mason
Inventor
F. N. Cline
By Raymond & Veeder
Attys.

UNITED STATES PATENT OFFICE.

FREDERICK N. CLINE, OF CHICAGO, ILLINOIS, ASSIGNOR TO ROCKWELL KING, OF SAME PLACE.

MACHINE FOR MAKING CASTINGS.

SPECIFICATION forming part of Letters Patent No. 427,837, dated May 13, 1890.

Application filed December 26, 1889. Serial No. 334,919. (No model.)

*To all whom it may concern:*

Be it known that I, FREDERICK N. CLINE, of Chicago, in the county of Cook and State of Illinois, have invented certain new and useful Improvements in Machines for Making Castings, of which the following is a specification.

The object of my invention is to facilitate the making of castings, in which hardness is a matter of indifference or is a desirable quality, such as chilled rolls, dumb-bells, counterbalance-weights for folding beds, sashes, &c. To accomplish this object, I dispense with sand-molding and provide a series of permanent molds, which are automatically operated to form and release the casting.

In the drawings I have shown molds for casting sash-weights; but such molds are merely illustrative, as the shape cast may be changed to suit the purpose for which the machine is designed.

Figure 2:
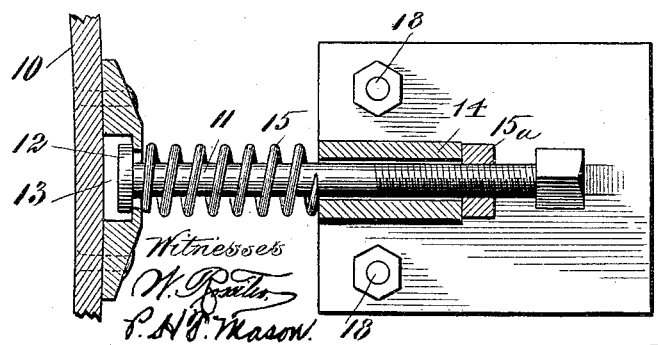

In the accompanying drawings, Figure 1 is plan view of the machine. Fig. 2 is a section showing details of construction hereinafter to be described. Fig. 3 is a side elevation. Figs. 4 and 5 show the construction of the molds. Fig. 5ª is a perspective view of the machine. Figs. 6 and 7 show a constructional modification.

2, Figs. 1 and 3, is an upright shaft adapted to be revolved in any suitable manner—as, for example, by gearing from shaft 3. Upon the shaft 2 the carrier-disk 4 is affixed, set-screws 5 5 being employed to secure it to the shaft, so that the disk may be shifted up or down on the shaft, as desired.

Upon the edge of the disk 4 are cut a number of dovetail grooves 6 6 for the attachment of the molds 7, the number of molds depending on the relative size of the disk and molds. In practice I contemplate using more than are shown in the drawings in some cases, as may seem desirable. Dovetail grooves are employed on account of the facility afforded for inserting and removing the molds. The molds are divided into two parts 7ª 7ᵇ on a plane cutting them longitudinally, the parts being connected by joints 8 8. Stops 9 prevent the parts of the mold from opening too widely.

Partially surrounding the circle of molds is an elastically-supported ring-segment 10, said segment being itself yielding or elastic. The office of said segment is to keep the molds shut when the metal is poured and until it solidifies. One of the supports for the segment is shown in detail in Fig. 2. A rod 11 is loosely attached to the segment, the head 12, formed on the end of the rod, being fitted loosely in a socket 13 of the segment, so as to permit lateral play. The opposite end of the rod is threaded and passes through the standard 14. A spring 15 is interposed between the standard 14 and the segment 10, so as to press the segment inward, the amount of such inward movement being limited by the nut 15ª on the threaded portion of the rod 11, which abuts against the standard 14. The standard 14 is adjustable in or out on the bed-plate 16 by means of the screw 17, Fig. 1, and bolts 18, the latter being inserted in slots 19 in the bed-plate. By the conjoint action of the adjustments just described the tension of the springs and the size of the ring 10 can be regulated with perfect exactness. There may be any number of the standards 14. In the drawings three are shown; but in a larger machine more may be needed. The movable half of each mold has at its lower end a projection 20, as seen in dotted lines in Fig. 1 and in side elevation in Fig. 3. On the bed-plate are other projections or cams 21 22, so placed as to come in contact with the projections 20 of the molds.

The operation is as follows: Referring to Fig. 1, the machine is intended to move in the direction of the arrow outside the ring-segment. The molds on the right of the drawings or the entering side of the ring-segment are filled with molten metal. The segment 10 exerts a yielding pressure on the molds, preventing the escape of melted metal, but allowing the molds to yield to the expansion of the metal as it changes from the molten to the solid state. The yielding pressure of the segment also compensates for any inequality of size or wear of the molds or rings. On revolving the machine the molds are brought to the exit side of the ring-segment, and by the time the casting has solidified enough to be safe the mold is opened by contact with the cam 21 and the casting drops out on the apron 23. After being relieved of its casting the mold is shut by contact with the cam 22 as the machine revolves. If the machine is set to run at a slow rate, its movement may be uninterrupted; but I prefer to give it an intermittent movement, as the molds can be more easily and quickly filled. In order to diminish friction between the molds and segment, I prefer to set the spring on the exit side of the segment 10, so as to exert less pressure on the molds, and even to set the segment so as to barely touch the molds. This is shown much exaggerated in Fig. 1. In order to further diminish friction, I propose also to provide the molds with anti-friction rollers 24, which bear upon the segment, this mode of construction being shown in Figs. 6 and 7. The ring-segment 10 in said figure is made broad, and two rollers 24 are placed on each mold, so as to form two bearing parts and keep both the top and bottom ends of the molds closed.

As before mentioned, the mold-carrying disk is adjustable up and down on the shaft 2. The standards 14 are also adjustable vertically, (vide Fig. 3,) being made in two telescopic parts c and d, and a set-screw e being provided for holding them when adjusted. Molds of different lengths can thus be accommodated.

What I claim, and desire to secure by Letters Patent, is—

1. The combination of a divided mold or molds, a revoluble carrier for said molds, and an elastically-supported ring partially surrounding said mold-carrier and adapted to make contact with the sides of said molds and hold one division closed against the other, substantially as described.

2. The combination of a vertical driving-shaft, a mold-carrier adjustably mounted thereon, a ring approximately concentric with said mold-carrier, and elastic supports for said ring mounted on extensible standards, whereby molds of different heights may be accommodated, substantially as described.

3. The combination of a mold or molds, a revoluble carrier for said molds, an elastically-supported ring partially surrounding said mold-carrier and adapted to make contact with the sides of said molds and hold one division closed against the other, and cams adapted to successively open and close said molds, substantially as described.

4. The combination of a revoluble mold-carrier, divided hinged molds mounted thereon, a ring adapted to maintain contact with the sides of said molds and hold one division closed against the other, spring-supports for said ring, consisting of rods loosely attached to said ring, standards supporting said rods, and springs interposed between said standards and said rings, substantially as shown and described.

FREDERICK N. CLINE.

Witnesses:
IRWIN VEEDER,
P. H. T. MASON.